(12) United States Patent
Takeuchi et al.

(10) Patent No.: US 7,019,768 B2
(45) Date of Patent: *Mar. 28, 2006

(54) SCANNING OPTICAL SYSTEM

(75) Inventors: Shuichi Takeuchi, Saitama-ken (JP); Daisuke Koreeda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 10/721,908

(22) Filed: Nov. 26, 2003

(65) Prior Publication Data
US 2004/0114028 A1 Jun. 17, 2004

(30) Foreign Application Priority Data
Nov. 28, 2002 (JP) .............................. 2002-346401

(51) Int. Cl.
G02B 26/10 (2006.01)
B41J 2/47 (2006.01)
(52) U.S. Cl. ....................... 347/244; 359/642
(58) Field of Classification Search ................ 347/230, 347/231, 243, 244, 258–261; 359/642, 708, 359/726, 728
See application file for complete search history.

(56) References Cited
U.S. PATENT DOCUMENTS

| 5,477,554 A | 12/1995 | Yoshii et al. |
| 5,748,352 A | 5/1998 | Hattori |
| 5,838,502 A | 11/1998 | Park et al. |
| 5,859,720 A | 1/1999 | Ishibe |
| 5,903,536 A | 5/1999 | Lee et al. |
| 5,986,993 A | 11/1999 | Yoo et al. |

FOREIGN PATENT DOCUMENTS
JP 09080333 3/1997

*Primary Examiner*—Huan Tran
(74) *Attorney, Agent, or Firm*—Greenblum & Bernstein, P.L.C.

(57) ABSTRACT

There is provided a scanning optical system including a collimator lens being placed on an optical path between a light source and a deflecting system. At least one of a front surface and a rear surface of the collimator lens includes a central area through which part of the laser beam in the vicinity of a central axis of the laser beam passes, at least one first outer area having an effect on the laser beam so that the laser beam after passing through said at least one first outer area is given a first phase difference not including a phase difference of zero, and at least one second outer area having an effect on the laser beam so that the laser beam after passing through said at least one second outer area is given a second phase difference being different from the first phase difference and including a phase difference of zero.

19 Claims, 12 Drawing Sheets

SCANNING OPTICAL SYSTEM

BACKGROUND OF THE INVENTION

The present invention relates to a scanning optical system for forming an electrostatic latent image on a scan target surface such as a surface of a photoconductive drum.

As is well known, scanning optical systems are installed in a variety of printing devices such as laser beam printers, fax machines and copy machines. The scanning optical system dynamically deflects a laser beam (which has been modulated according to image information) by use of a deflecting system such as a rotating polygon mirror and converges the dynamically deflected laser beam on the surface (the scan target surface) of the photoconductive drum by use of an imaging optical system, by which the scan target surface is scanned with a spot beam and thereby an electrostatic latent image composed of a plurality of dots are drawn on the scan target surface.

In general, intensity distribution of the laser beam incident on the scan target surface is not a perfect Gaussian distribution, and it is known that the main beam is accompanied by several rings of light (side lobes) of lower light quantity which are caused by diffraction at apertures placed on the optical path of the laser beam. The side lobe is known to expose the photoconductive drum and cause print error called "black stripes" in halftone printing if the intensity of the side lobe exceeds approximately 6% of the central intensity of the main beam (reference: Japanese Patent Provisional Publication No. HEI09-080333). In an ideal state of the imaging optical system, intensities of side lobes remain at approximately 4% of the central intensity of the main beam, by which the black stripes are not caused.

However, if microscopic undulations exist on an optical surface of the imaging optical system, the intensity of the side lobe changes if the laser beam passes through the undulating part. In this case, if the intensity of the side lobe exceeds the threshold value, the black stripes occur in halftone printing.

SUMMARY OF THE INVENTION

The present invention is advantageous in that it provides a scanning optical system which is capable of reducing the possibility of high side lobe intensity exceeding a threshold value even when optical surfaces of an imaging optical system have certain microscopic undulations.

According to an aspect of the invention, there is provided a scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on the scan target surface. The scanning optical system includes a collimator lens placed on an optical path between the light source and the deflecting system.

In this structure, at least one of a front surface and a rear surface of the collimator lens includes a central area through which part of the laser beam in the vicinity of a central axis of the laser beam passes, at least one first outer area through which part of the laser beam outside the laser beam incident on the central area passes, the at least one first outer area having an effect on the laser beam so that the laser beam after passing through the at least one first outer area is given a first phase difference with respect to the laser beam passing through the central area, the first phase difference not including a phase difference of zero. Further, the at least one of the front surface and the rear surface of the collimator lens includes at least one second outer area through which part of the laser beam other than the laser beam incident on the central area and the at least one first outer area passes, the at least one second outer area having an effect on the laser beam so that the laser beam after passing through the at least one second outer area is given a second phase difference with respect to the laser beam passing through the central area, the second phase difference being different from the first phase difference and including a phase difference of zero.

With this configuration, it is possible to sufficiently reduce the possibility that the intensity of the side lobe exceeds the threshold value to expose a photosensitive material on the scan target surface even if one or more lens surfaces of the imaging optical system have certain microscopic undulations. Consequently, occurrence of black stripes in halftone printing can be prevented.

Since a structure for producing the first and second phase differences are integrally formed on the collimator lens (i.e., a separate phase shift element is not used in the scanning optical system), adjustment of the phase shift element can be omitted, and therefore losing symmetry of intensity distribution of the beam spot can be prevented.

Optionally, the first phase difference may satisfy the following conditions:

$$\cos \theta \leq 0 \tag{1}$$

$$0 < \theta < 10\pi \tag{2}$$

where $\theta$ [rad] represents the first phase difference, and $\theta$ is positive ($0<\theta$) when the thickness of the collimator lens changes in a decreasing direction from the central area through the at least one first outer area by a step formed between the central area and the at least one first outer area.

Alternatively, the first phase difference may satisfy the following conditions:

$$\cos \theta \leq 0 \tag{6}$$

$$-10\pi < \theta < 0 \tag{7}$$

where $\theta$ [rad] represents the first phase difference, and $\theta$ is negative ($0>\theta$) when the thickness of the collimator lens changes in an increasing direction from the central area through the at least one first outer area by a step formed between the central area and the at least one first outer area.

In a case where the first phase difference $\theta$ satisfies the conditions (1) and (2) or the conditions (6) and (7), the first phase difference has the highest effect of reducing intensity of the side lobe if the first phase difference is expressed by $\pi \times (2N-1)$ [rad], where N is an integer.

If the first phase difference $\theta$ exceeds the upper limit of the condition (1) or (6), the effect of reducing the intensity of the side lobe decreases.

If the first phase difference $\theta$ exceeds the upper limit of the condition (2), the thickness of the collimator lens within the first outer area becomes too small relative to the thickness of the collimator lens within the central area.

If the first phase difference $\theta$ gets less than the lower limit of the condition (7), the thickness of the collimator lens within the first outer area becomes too big relative to the thickness of the collimator lens within the central area.

Still optionally, if the first phase difference satisfies the conditions (1) and (2), the second phase difference may satisfy the following conditions:

$$0.9 \leq \cos \theta' \quad (3)$$

$$0 < \theta' < 10\pi \quad (4)$$

$$\theta < \theta' \quad (5)$$

where θ' [rad] represents the second phase difference, and θ is positive (0<θ') when the thickness of the collimator lens changes in a decreasing direction from the central area through the at least one second outer area by a sum of a step formed between the central area and the at least one first outer area and a step formed between the at least one first outer area and the at least one second outer area.

Alternatively, if the first phase difference satisfies the condition (6) and (7), the second phase difference may satisfy the following conditions:

$$0.9 \leq \cos \theta' \quad (8)$$

$$-10\pi < \theta' < 0 \quad (9)$$

$$\theta' < \theta \quad (10)$$

where θ' [rad] represents the second phase difference, and θ' is negative (0>θ') when the thickness of the collimator lens changes in an increasing direction from the central area through the at least one second outer area by a sum of a step formed between the central area and the at least one first outer area and a step formed between the at least one first outer area and the at least one second outer area.

In a case where the second phase difference θ' satisfies the conditions (3)–(5) or the conditions (8)–(10), reduction of intensity at the center of the beam can be prevented if the second phase difference is expressed by π×2M [rad], where M is an integer.

If the second phase difference θ' gets lower the lower limit of the condition (3) or (8), the effect of reducing the intensity of the side lobe decreases and the reduction amount of the intensity at the center of the beam becomes bigger.

If the second phase difference θ' exceeds the upper limit of the condition (4), the thickness of the collimator lens within the second outer area becomes too small relative to the thickness of the collimator lens within the central area.

If the second phase difference θ' gets less than the lower limit of the condition (9), the thickness of the collimator lens within the second outer area becomes too big relative to the thickness of the collimator lens within the central area.

If the condition (5) is satisfied, the first and the second areas are similarly recessed with respect to the central area. Also, if the condition (10) is satisfied, the first and the second areas similarly protrude with respect to the central area. Consequently, it becomes possible to ease the process of a mold of the collimator lens.

In a particular case, the at least one first outer area may include a plurality of first outer areas, and the at least one second outer area may include a plurality of second outer areas.

Optionally, the plurality of first outer areas and the plurality of second outer areas may be provided in the scanning optical system as a plurality of pairs of the first and second outer areas.

As the number of the first and second outer areas increases, loss of light amount increases. Therefore, the plurality of pairs of the first and second outer areas preferably include two pairs of the first and second outer areas.

In a particular case, one of the first outer areas nearest to the central axis of the laser beam may adjoin the central area from the outside of the central area with respect to the central axis of the laser beam.

Optionally, one of the second outer areas nearest to the central axis of the laser beam may adjoin the one of the first outer areas nearest to the central axis of the laser beam from the outside of the one of the first outer areas nearest to the central axis of the laser beam with respect to the central axis of the laser beam.

In a particular case, the plurality of first outer areas and the plurality of second outer areas are arranged alternately outward from the central area.

Optionally, the plurality of the first and second outer areas may be formed to be concentrically arranged step-like rings, respectively, with respect to the central axis of the laser beam.

In a particular case, thickness of the collimator lens may change in an increasing direction at each step formed between adjacent step-like rings.

Alternatively, thickness of the collimator lens may change in a decreasing direction at each step formed between adjacent step-like rings.

Optionally, the scanning optical system may satisfy a condition:

$$0.03 < S'/S < 0.3 \quad (11)$$

where S' represents a size of a portion of the at least one first outer area, the laser beam being incident on the at least one first outer area within the portion of the at least one first outer area, and S represents a size of a laser beam cross section orthogonal to the central axis of the laser beam on a surface of the collimator lens having the central area and at least one first and second outer areas.

If S'/S gets lower the lower limit of the condition (11), the effect of reducing the intensity of the side lobe decreases. If S'/S exceeds the upper limit of the condition (11), the reduction amount of the intensity of the center of the beam becomes large.

In a particular case, the collimator lens may further include a shading part as an aperture stop, and the central area and the at least one first and second outer areas are placed in an aperture of the shading part. Since the aperture stop is integrally formed on the collimator lens, misalignment between the collimator lens and an aperture stop does not occur. Therefore, losing symmetry of intensity distribution of the beam spot can be prevented.

In a particular case, the at least one first outer area and the at least one second outer area may be arranged on both sides of the central area along the main scanning direction in order in which the at least one first outer area is arranged inside the at least one second outer area with reference to the central area.

In a particular case, the imaging optical system includes a reflecting surface.

A printer having the above mentioned scanning optical system can also be provided.

BRIEF DESCRIPTION OF THE ACCOMPANYING DRAWINGS

DETAILED DESCRIPTION OF THE EMBODIMENTS

Hereinafter, embodiments according to the present invention are described with reference to the accompanying drawings.

In each of the following embodiments, a scanning optical system according to the present invention will be applied to a laser beam printer as an example of a device employing the scanning optical system.

FIRST EMBODIMENT

<Outline of Configuration of Laser Beam Printer>

Figure 1:
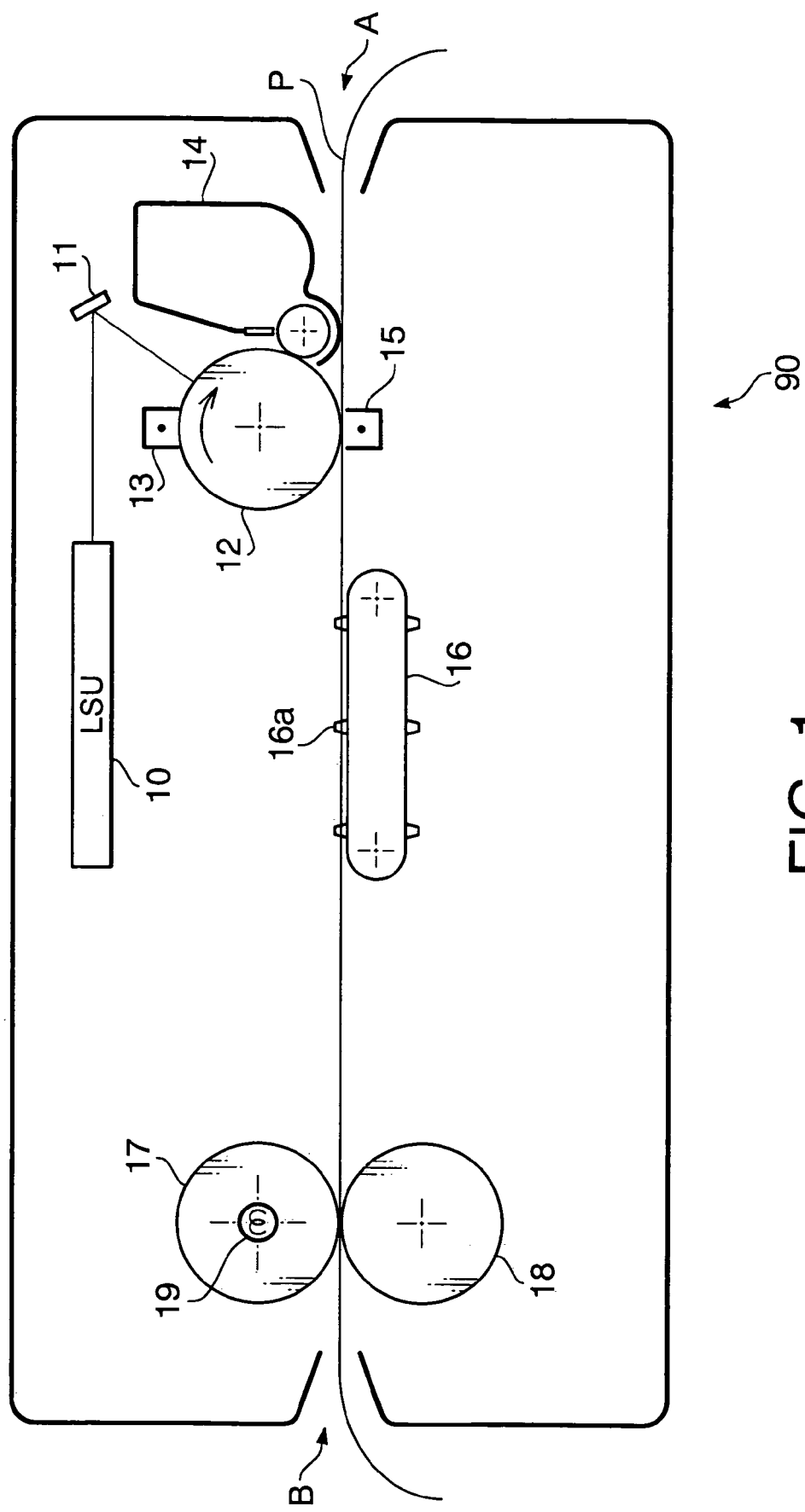
FIG. 1 is a schematic block diagram briefly showing a configuration of a laser beam printer according to a first embodiment.

First, the outline of the configuration of a laser beam printer 90 will be explained referring to FIG. 1. FIG. 1 is a schematic block diagram briefly showing the configuration of the laser beam printer 90 of the first embodiment. The laser beam printer 90 is connected to a device such as a personal computer (not shown), receives print data (including image data) from the device, and prints an image according to the image data on continuous paper (fanfold paper P, for example).

Around a photoconductive drum 12 shown in FIG. 1, a charging module 13, a reflecting mirror 11, a development module 14, and a transfer module 15 are placed in the clockwise order. When the photoconductive drum 12 rotates in the clockwise direction in FIG. 1, the charging module 13 electrostatically charges the surface of the photoconductive drum 12 first. Subsequently, a scanned beam (modulated beam) outputted by an LSU (Laser Scanning Unit) 10 according to the print data is reflected by the reflecting mirror 11 to the photoconductive drum 12 and thereby an electrostatic latent image is formed on the surface of the photoconductive drum 12.

Subsequently, the development module 14 applies toner on the electrostatic latent image and thereby develops the latent image into a toner image. Finally, the transfer module 15 transfers the toner image to the fanfold paper P.

The fanfold paper P is continuous paper which is guided from an inlet opening A to an outlet opening B of the laser beam printer. On both edges of the fanfold paper P, unshown feeding holes are formed at preset intervals. A tractor 16 is a belt conveyer having projections 16a to be engaged with the feeding holes, by which the fanfold paper P is fed at a traveling speed equal to the peripheral speed of the rotating photoconductive drum 12.

On the downstream side of the tractor 16, a heat roller 17 and a press roller 18 are provided in order to hold and press the fanfold paper P from both sides. The heat roller 17, including a halogen lamp 19 as a heater, is driven and rotated by an unshown motor at a peripheral speed equal to the traveling speed of the fanfold paper P. The press roller 18, pressing the heat roller 17 with constant pressure, is rotated according to the rotation of the heat roller 17. Thus, when part of the fanfold paper P to which the toner image has been transferred from the photoconductive drum 12 passes through the heat roller 17 and press roller 18, the toner on the paper is squashed by the heat and pressure applied by the rollers 17 and 18, by which the toner image is fixed on the fanfold paper P.

<Optical Configuration of LSU>

Figure 2:
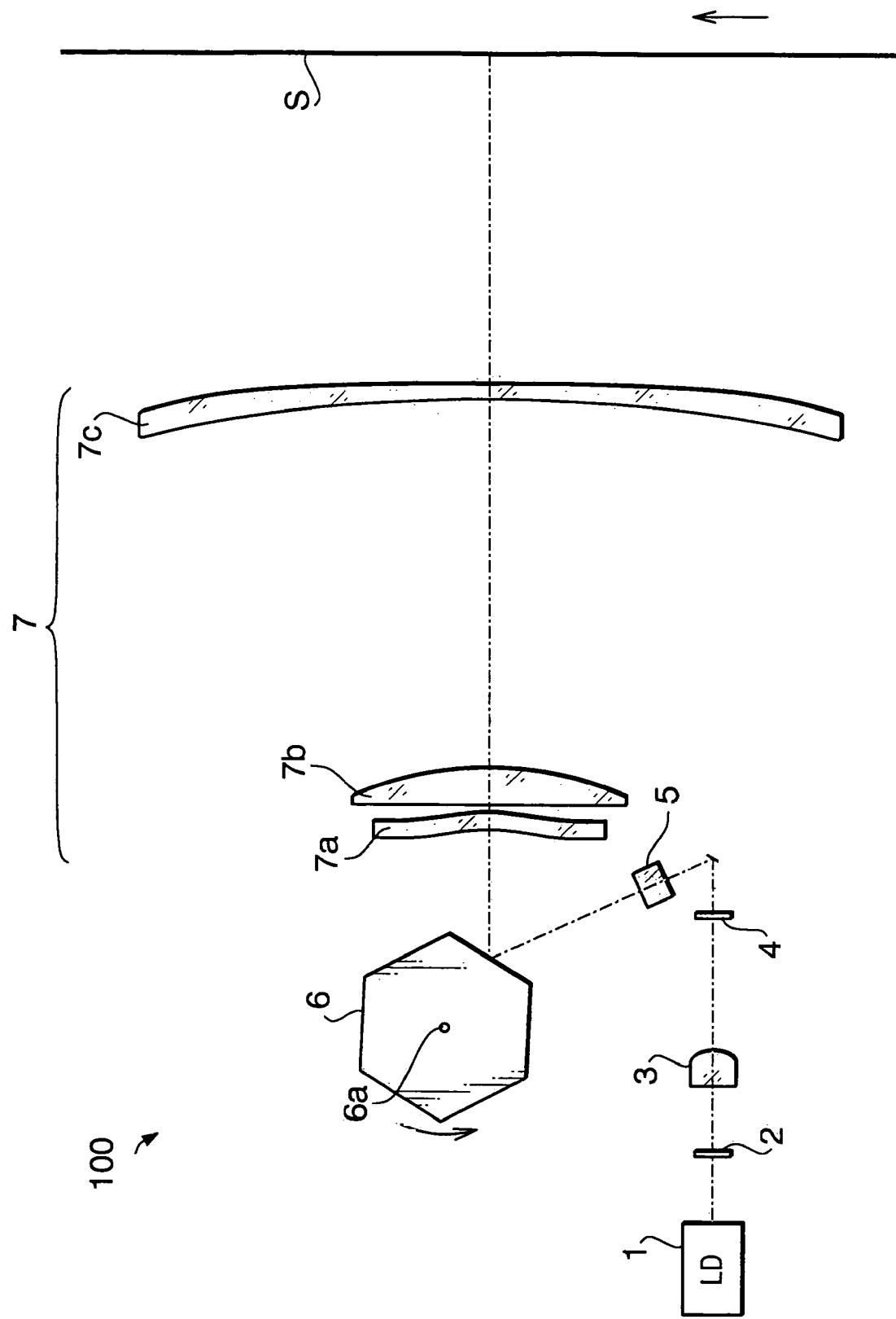
FIG. 2 is a schematic optical block diagram of a scanning optical system according to a first embodiment.

Next, a scanning optical system 100 installed in the LSU 10 will be explained in detail. FIG. 2 is a schematic optical block diagram of the scanning optical system 100. As shown in FIG. 2, the scanning optical system 100 includes a laser light source 1, a cover glass 2, a collimator lens 3, an aperture stop 4, a cylindrical lens 5, a polygon mirror 6, and an fθ lens group 7 including lenses 7a–7c.

The laser beam emitted from the laser light source 1 as a diverging beam passes through the cover glass 2 and is collimated by the collimator lens 3 into a parallel beam having an elliptical sectional form. The collimated beam passes through the aperture stop 4 and the cylindrical lens 5, and then is incident on a reflective surface of the polygonal mirror 6.

Since the polygonal mirror 6 rotates about its rotational axis 6a at a constant angular speed, the beam incident on the reflective surface of the polygonal mirror 6 is deflected within a predetermined angular range by the reflective surface of the polygonal mirror 6.

The laser beam deflected by the polygon mirror 6 passes through first through third lenses 7a–7c of the fθ lens group 7 configured as the imaging optical system (focal length: 135.5 mm), by which the laser beam is converged into a spot beam exposing the scan target surface S. According to the dynamic deflection by the rotating polygon mirror 6, the surface of the photoconductive drum 12 (scan target surface S) is scanned with the spot beam in a main scanning direction at a constant speed.

The scanning spot beam draws a linear trail (a scan line) on the scan target surface S. Thus, by the movement of the scan target surface S in an auxiliary scanning direction (perpendicular to the main scanning direction) at a constant speed, a plurality of scan lines are formed on the scan target surface S at even intervals. Since the laser beam repetitively scanned on the scan target surface S has been on-off modulated by an unshown modulator (or by the laser light source 1) according to the image information, a two-dimensional image composed of a plurality of dots is drawn on the scan target surface S.

With regard to the main scanning direction, the laser beam which passed through the cylindrical lens 5 is reflected by the polygon mirror 6 maintaining its parallelism and is converged on the scan target surface S by the refractive power of the fθ lens group 7. Meanwhile, with regard to the auxiliary scanning direction, the laser beam is once focused on a point in the vicinity of a reflecting surface of the polygon mirror 6 by the refractive power of the cylindrical lens 5, enters the fθ lens group 7 as a diverging beam, and is focused again on the scan target surface S by the refractive power of the fθ lens group 7.

Since the point in the vicinity of the reflecting surface of the polygon mirror 6 and the scan target surface S are set optically conjugate with each other by the fθ lens group 7 with regard to the auxiliary scanning direction, deviation of scanning position on the scan target surface S in the auxiliary scanning direction caused by slight tilting (the so called "facet error") of each reflecting surface of the polygon mirror 6 is corrected and eliminated.

<Collimator Lens>

Figure 3:
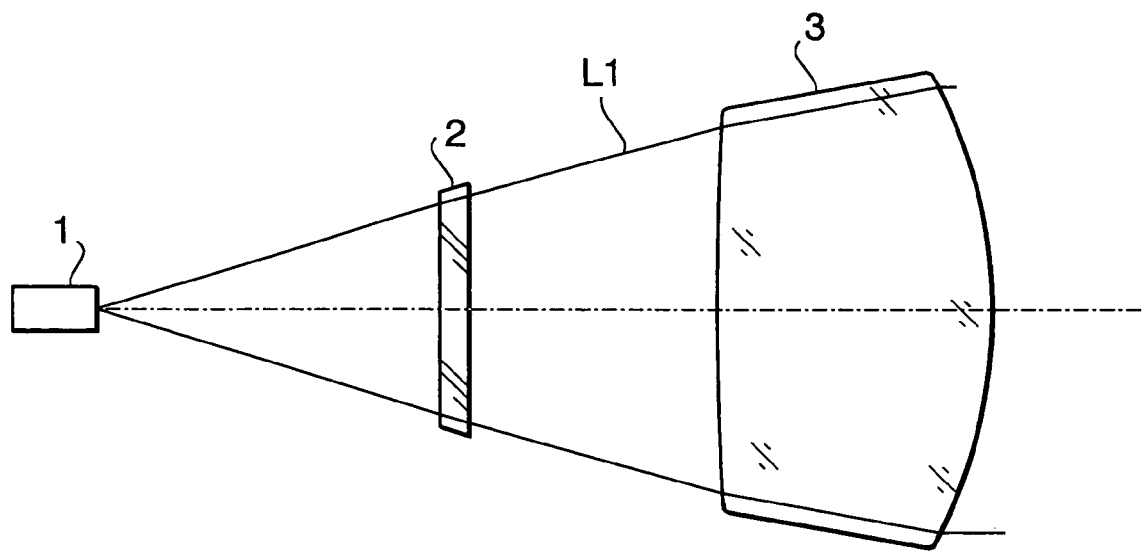
FIG. 3 is a cross sectional view illustrating a beam passing through a cover glass and a collimator lens provided in the scanning optical system.

The collimator lens 3 will be described in detail. FIG. 3 is a cross sectional view illustrating the beam L1 passing through the cover glass 2 and the collimator lens 3.

TABLE 1 shows a concrete numerical configuration of the cover glass 2 and the collimator lens 3. In TABLE 1, values on an optical axis are indicated.

TABLE 1

|    | R      | d     | n       |
|----|--------|-------|---------|
| P  | —      | 3.974 | —       |
| #1 | ∞      | 0.300 | 1.51072 |
| #2 | ∞      | 3.000 | —       |
| #3 | 43.480 | 3.200 | 1.58252 |
| #4 | −5.800 | —     | —       |

In TABLE 1, the character "#1–#4" indicate surface numbers that are assigned to optical surfaces the cover glass 2 and the collimator lens 3. Specifically, the #1 and #2 denote a front surface (a light source side) and a rear surface (a beam emerging surface) of the cover glass 2, respectively. The #3 and #4 denote a front surface (a light source side) and a rear surface (a beam emerging surface) of the collimator 3, respectively. The character "P" denotes a light emitting point of the laser light source 1.

The character "R" denotes a radius of curvature [mm] of each optical surface. The character "d" denotes the distance [mm] between an optical surface and the next optical surface, and "n" denotes a refractive index of each lens at a design wavelength 780 nm. The collimator lens 3 has a focal length of 9.00 mm and a numerical aperture NA of 0.30.

The front surface #3 of the collimator lens 3 is formed to be a rotationally symmetrical aspherical surface.

The rotationally symmetrical aspherical surface is expressed by the following equation:

$$X(h) = \frac{\left(\frac{1}{R}\right)h^2}{1 + \sqrt{1 - (1+\kappa)h^2\left(\frac{1}{R}\right)^2}} + A_4 h^4 + A_6 h^6 + A_8 h^8 \ldots \quad (12)$$

where X(h) represents a SAG amount which is a distance between a point on the aspherical surface at a height of h ($h=(y^2+z^2)^{1/2}$) from the optical axis and a plane tangential to the aspherical surface at the optical axis. κ represents a conical coefficient, and $A_4$, $A_6$, $A_8$ . . . are aspherical coefficients of $4^{th}$, $6^{th}$, $8^{th}$ . . . orders, respectively. The R is a radius of curvature of the rotationally symmetrical aspherical surfaces on the optical axis.

When the front surface #3 of the collimator lens 3 is expressed using the equation (12), the front surface #3 of the collimator lens 3 has a conical coefficient and aspherical coefficients indicated in TABLE 2. Aspherical coefficients not shown in TABLE 2 are all zero.

TABLE 2

|       | #6          |
|-------|-------------|
| R     | 43.4800 mm  |
| κ     | 0.000       |
| $A_4$ | −6.5050E−05 |
| $A_6$ | 1.7840E−05  |

Figure 4:
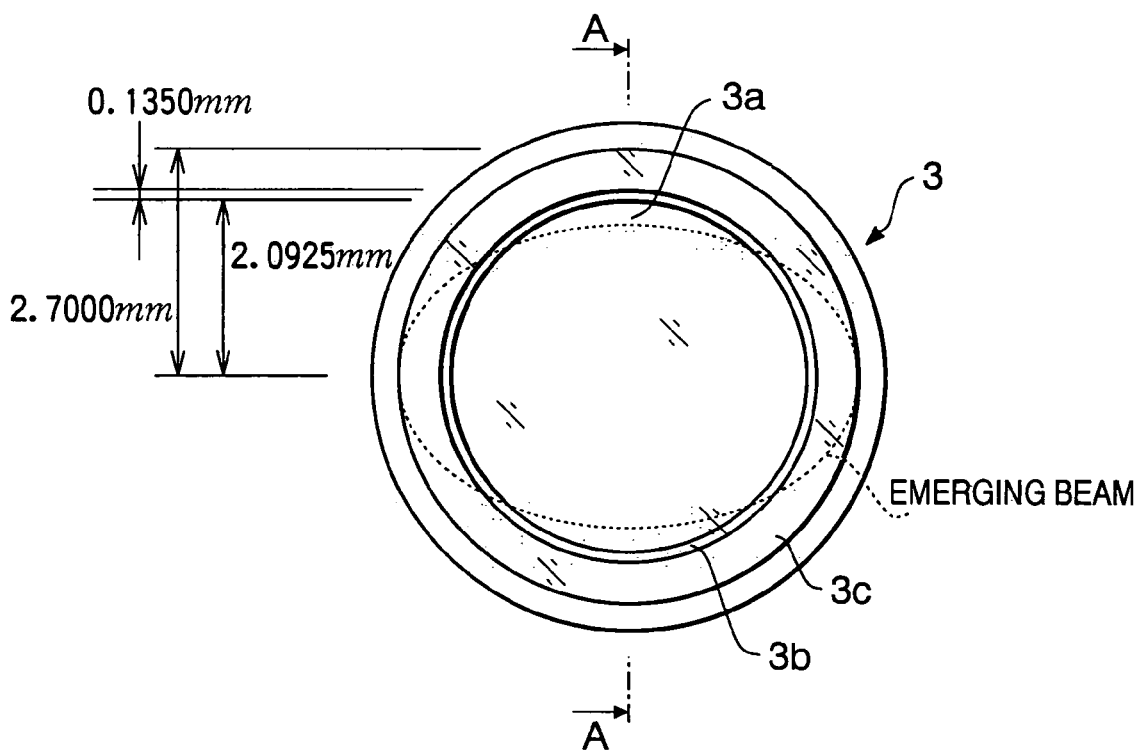
FIG. 4 shows a rear surface of the collimator lens viewed from a beam emerging side.
Figure 5:
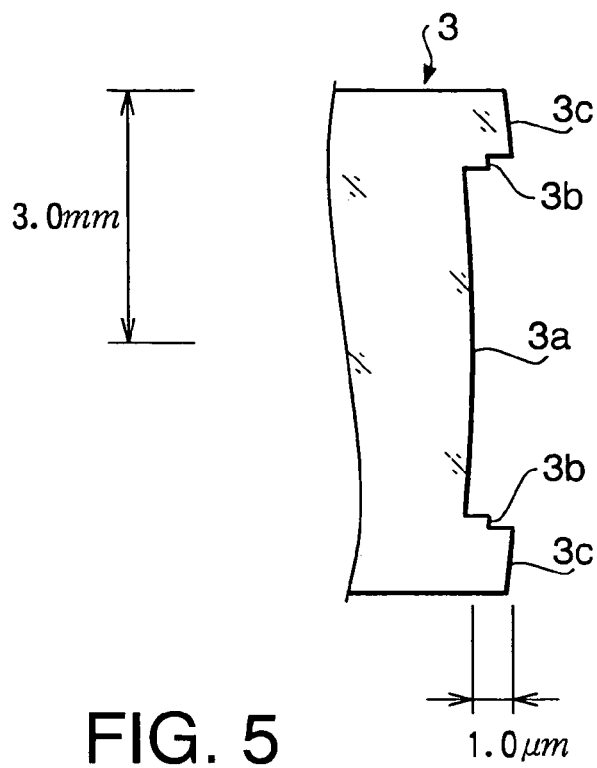
FIG. 5 shows a partial cross section of the collimator lens.

FIG. 4 shows the rear surface of the collimator lens 3 viewed from the beam emerging side. FIG. 5 shows a partial cross section of the collimator lens 3 when it is cut along a line A—A shown in FIG. 4. It should be noted that, in FIG. 5, a size in a direction of the optical axis of the collimator lens 3 (i.e., a horizontal direction on FIG. 5) of the collimator lens is exaggerated.

As shown in FIG. 4, the rear surface of the collimator lens 3 includes a central area 3a having a circular form and situated at a central section of the rear surface, a first area 3b which has a form of a ring and in which the central area 3a is inscribed, and a second area 3c which has a form of a ring and in which the first area 3b is inscribed.

As shown in FIG. 5, the first area 3b protrudes toward the beam emerging side with respect to the central area 3a. The second area 3c protrudes toward the beam emerging side with respect to the first area 3b. Since protruding sizes of the first area 3b and the second area 3c with respect to the central area 3a are extremely small, the macroscopic shape of the rear surface of the collimator 3 is a continuous surface.

The central surface 3a is formed to be a rotationally symmetrical aspherical surface. The first area 3b is formed to be a portion of an imaginary rotational symmetrical aspherical surface (see a dashed line IM1 in FIG. 6). Also, the second area 3c is formed to be a portion of an imaginary rotational symmetrical aspherical surface (see a dashed line IM2 in FIG. 6).

Figure 6:
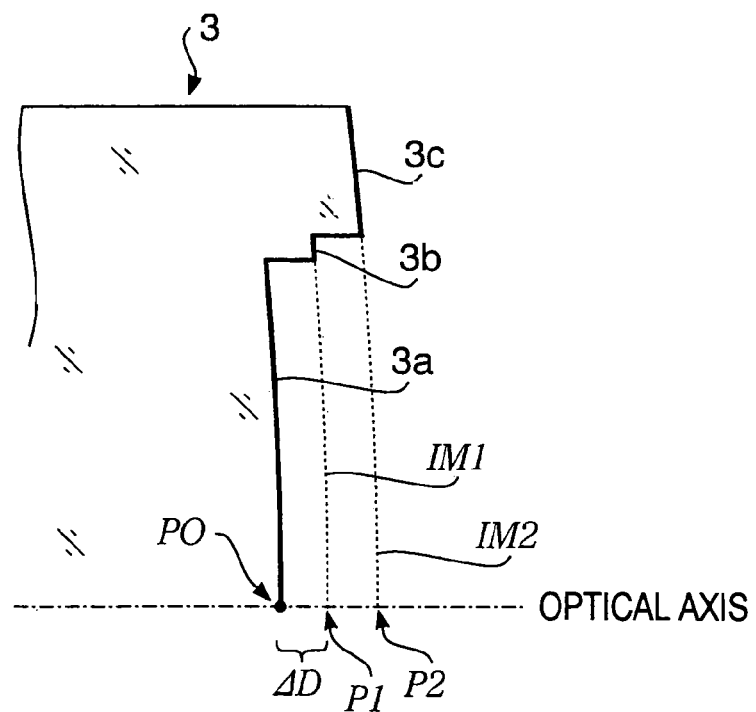
FIG. 6 shows a cross section of the collimator lens and imaginary surfaces of a first area and a second area.

Similarly to FIG. 5, FIG. 6 shows a cross section of the collimator lens 3. In FIG. 6, the imaginary surface IM1 of the first area 3b and the imaginary surface IM2 of the second area 3c are also indicated. As explained below, the shapes of the first area 3b and the second area 3c are defined using the radii of curvature on-the optical axis, conical coefficients and the aspherical coefficients of the imaginary surfaces IM1 and IM2.

When each of surface shapes of the central area 3a, the first area 3b and the second area 3c is expressed using the equation (12), the central area 3a, the first area 3b and the second area 3c have a conical coefficient and aspherical coefficients indicated in TABLE 3. Aspherical coefficients not shown in TABLE 3 are all zero.

TABLE 3

|  | Central Area | First Area | Second Area |
|---|---|---|---|
| hmax | 2.0925 mm | 2.2275 mm | 2.7000 mm |
| R | −5.8000 mm | −5.8003 mm | −5.8005 mm |
| κ | −0.5000 | −0.5000 | −0.5000 |
| $A_4$ | 1.0890E−04 | 1.0888E−04 | 1.0886E−04 |
| $A_6$ | 7.1370E−06 | 7.1345E−06 | 7.1320E−06 |
| $A_8$ | 2.2930E−07 | 2.2936E−07 | 2.2942E−07 |
| $A_{10}$ | 1.2660E−08 | 1.2648E−08 | 1.2635E−08 |
| ΔD | 0.00000 mm | 0.00067 mm | 0.00134 mm |

In TABLE 3, the character "hmax" denotes a maximum effective radius of each surface measured along a direction perpendicular to the optical axis of the collimator lens 3. The character "ΔD" denotes distances between each surface (IM1 and IM2) and the central area 3a along the optical axis. More specifically, with regard to the first area 3b, ΔD is a distance between an origin point P0 (which is an intersection of the central area 3a and the optical axis) and a point P1 (which is an intersection of the imaginary surface IM 1 and the optical axis) (see FIG. 6). With regard to the second area 3c, ΔD is a distance between the origin point P0 and a point P2 (which is an intersection of the imaginary surface IM 2 and the optical axis) (see FIG. 6).

A value of ΔD has a plus sign when the point P1 or P2 is shifted, with respect to the origin point P0, to a direction in which the thickness of the collimator lens 3 increases.

The collimator lens 3 is positioned so that part of the beam L1 emerged from the cover glass 2 in the vicinity of a central axis of the beam L1 passes through the central area 3a.

As shown in FIG. 4 and TABLE 2, the maximum effective radius of the second area 3c is 2.7 mm, and the maximum effective radius of the central area 3a is 2.0925 mm. A width of the first area 3b in the radial direction is 0.135 mm.

The beam passed through the collimator lens 3 is shaped to have an elliptical form having the major axis extending in the main scanning direction and the minor axis extending in the auxiliary scanning direction (see a broken line in FIG. 4). In this embodiment, the major radius (a radius on the major axis) of the cross sectional form of the beam is 2.7 mm, and the minor radius (a radius on the minor axis) is 1.8 mm. Therefore, most of the beam L1 passes through the central area 3a, and a small portion of the beam L1 passes through the first area 3b and the second area 3c.

As described above, the first area 3b and the second area 3c protrude toward the beam emerging side from the central area 3a, each of the first area 3b and the second area 3c functions to produce a phase difference between a beam passing therethrough and a beam passing through the central area 3a.

More specifically, the beam which passed through the first area 3b has the phase difference of −π [rad] corresponding to an optical path difference of a half-wavelength (λ/2 [nm]). The beam which passed through the second area 3c has the phase difference of −2π [rad].

In this case, the beam passed through the central area 3a and the beam passed through the second area 3c are in phase with respect to each other. The beam passed through the first area 3b is given the phase difference −π [rad] with respect to the beam passed through the central area 3a.

If the phase difference −π of the beam which passed through the first area 3b is defined as a phase difference θ [rad] and the phase difference −2π of the beam which passed through the second area 3c is defined as a phase difference θ' [rad], the phase difference θ and the phase difference θ' satisfy the following conditions (6)–(10).

$$\cos \theta \leq 0 \tag{6}$$

$$-10\pi < \theta < 0 \tag{7}$$

$$0.9 \leq \cos \theta' \tag{8}$$

$$-10\pi < \theta' < 0 \tag{9}$$

$$\theta' < \theta \tag{10}$$

Intensity distribution of the beam scanned on the scan target surface S by the scanning optical system 100 according to the first embodiment will be explained. In the following, the intensity distribution in the scanning optical system 100 (i.e., the scanning optical system with the first and second areas 3b and 3c) is compared with a comparative example which has the same configuration as the first embodiment except that the rear surface of the collimator lens 3 does not have the first area 3b and the second area 3c (i.e., the scanning optical system without the first and second areas 3b and 3c).

Figure 7:
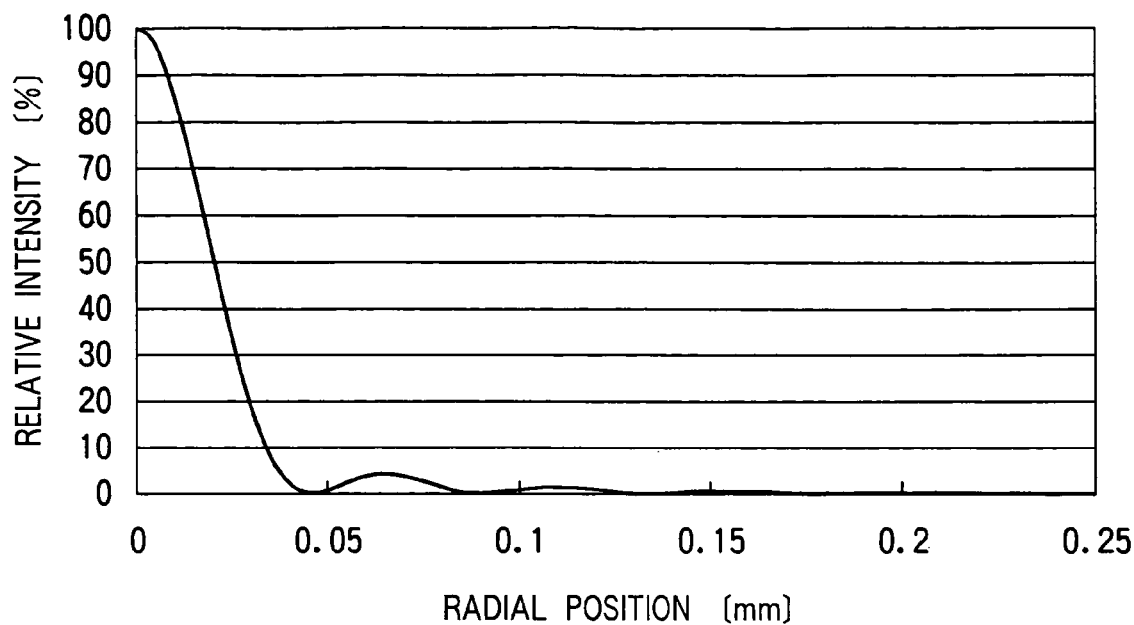
FIG. 7 is a graph showing intensity distribution of a beam formed on a scan target surface by the scanning optical system without the first and the second areas.
Figure 8:
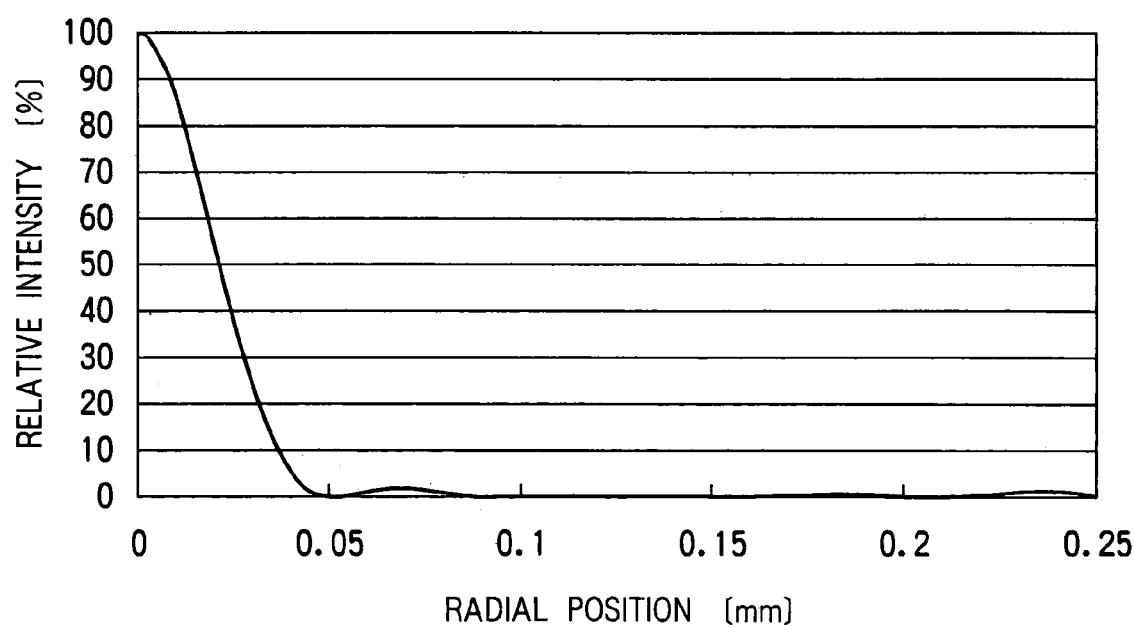
FIG. 8 is a graph showing intensity distribution of a beam formed on the scan target surface by the scanning optical system according to the first embodiment.

FIG. 7 is a graph showing the intensity distribution of the beam formed on the scan target surface S by the scanning optical system without the first and the second areas 3b and 3c. FIG. 8 is a graph showing the intensity distribution of the beam formed on the scan target surface S by the scanning optical system 100 according to the first embodiment. In FIGS. 7 and 8, the intensity distribution is measured in a range from the central axis of the beam to a point 0.25 mm away from the central axis in the main scanning direction. In FIGS. 7 and 8, the intensity is indicated as a ratio relative to the central intensity of the beam.

Figure 9:
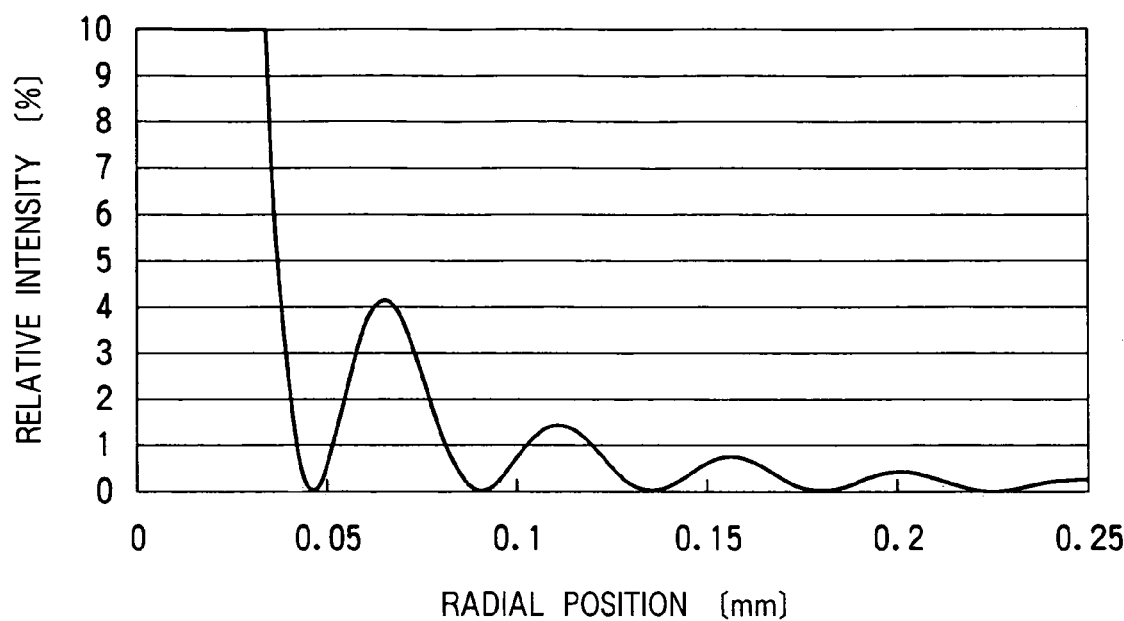
FIG. 9 is a graph magnifying a relative intensity range 0%–10% of the graph of FIG. 7.
Figure 10:
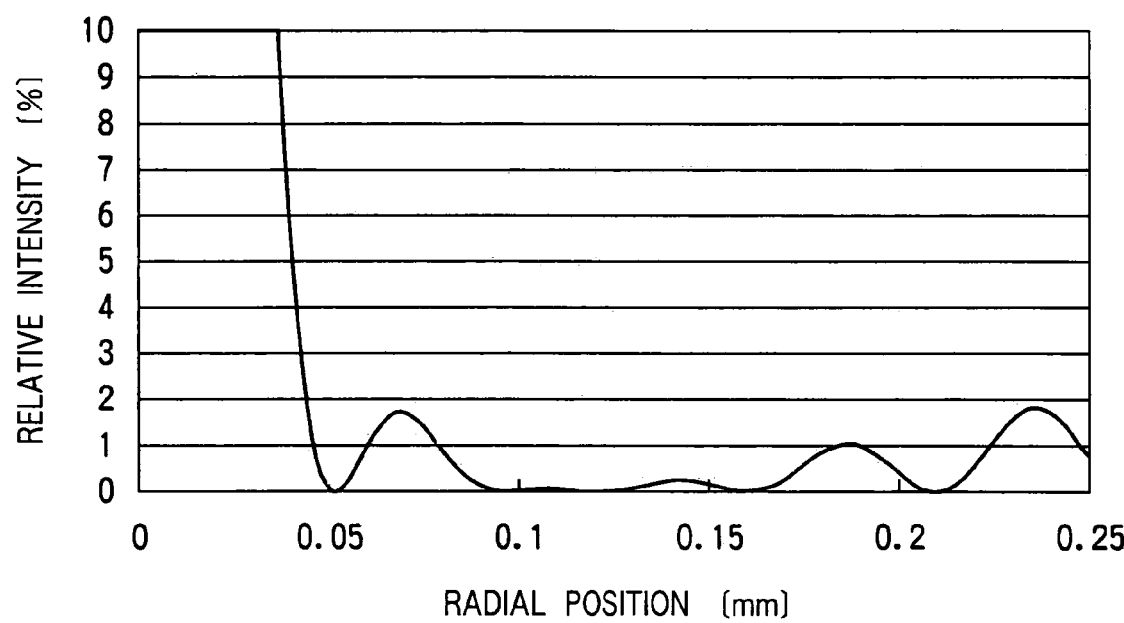
FIG. 10 is a graph magnifying a relative intensity range 0%–10% of the graph of FIG. 8.

FIG. 9 is a graph magnifying a relative intensity range 0%–10% of the graph of FIG. 7. FIG. 10 is a graph magnifying a relative intensity range 0%–10% of the graph of FIG. 8.

As shown in FIGS. 7 and 9, in the case where the first and second areas 3b and 3c are not formed on the rear surface of the collimator lens 3, the intensity of the side lobe gets lower as the distance from the main beam gets longer, and the intensity of the side lobe adjacent to the main beam is a little over 4%.

In contrast, as shown in FIGS. 8 and 10, in the case where the first and second areas 3b and 3c are formed on the rear surface of the collimator lens 3, all of the intensities of the side lobes do not exceed 2% in all diameter directions.

Therefore, even if one or more of the intensities of the side lobes are increased by several % due to certain microscopic undulations of lens surfaces of the lenses 7a–7c of the fθ lens group 7, all of the intensities of the side lobes hardly exceed a threshold value required for the exposure of the photoconductive drum 12.

When the rear surface of the collimator lens 3 is viewed from the beam emerging side (see FIG. 4), it is desirable that a size S' which is a size of the first area 3b inside the broken line in FIG. 4 (i.e., inside the cross section of the beam) is set properly relative to a size S of the cross section of the beam after passing through the collimator lens 3. In the first embodiment, a ratio S'/S is 0.06, and therefore the collimator lens 3 satisfies the condition (11).

$$0.03 < S'/S < 0.30 \quad (11)$$

Figure 11:
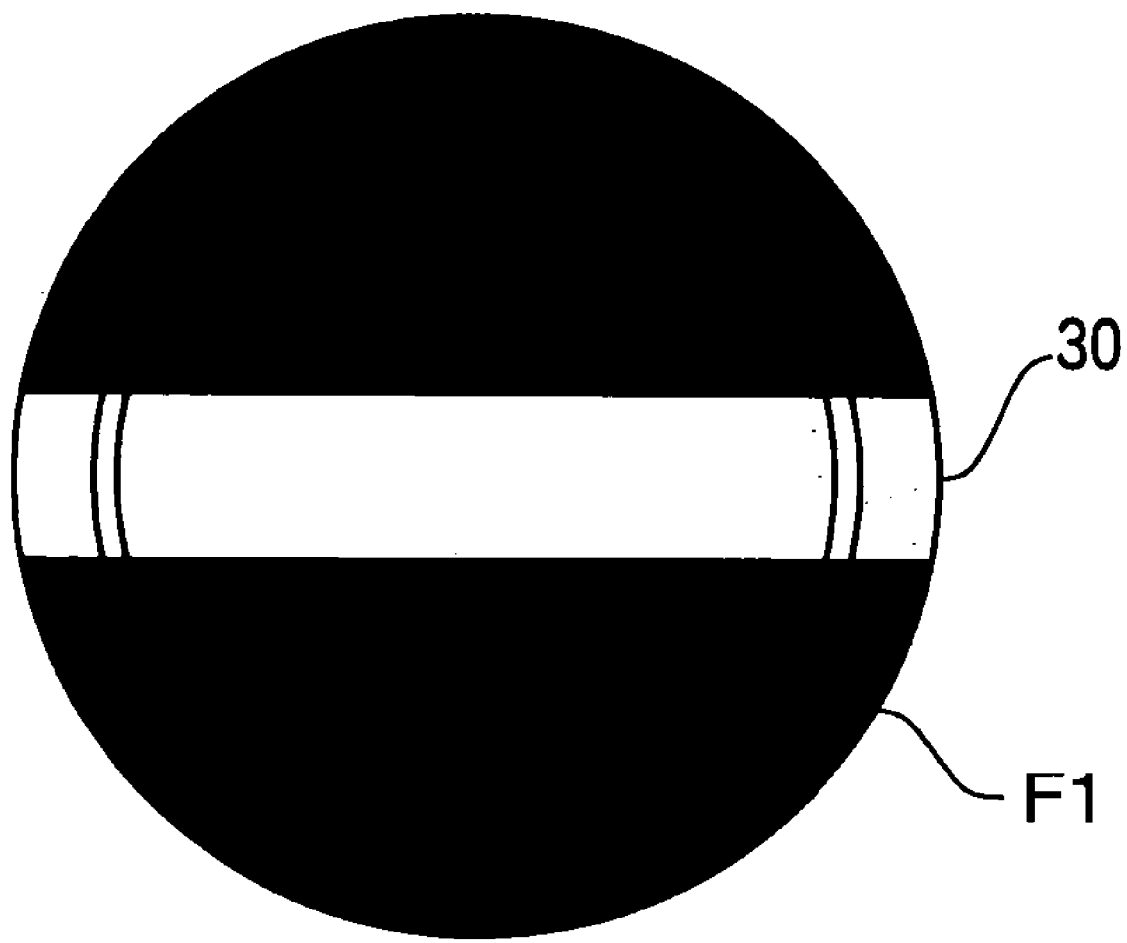
FIG. 11 shows a beam emerging surface of an integrated element which has a film on its rear surface.

While the collimator lens 3 and the aperture stop 4 are described as separate components in the above explanation, they can also be formed integrally. For example, as shown in FIG. 11, such an integrated element can be formed by applying a film or coating (transmittance=0) having an aperture which functions similarly to the aperture stop 4 to the rear surface of the collimator lens 3. FIG. 11 shows a beam emerging surface of such an integrated element 30 which has a film F1 on its rear surface.

Figure 12:
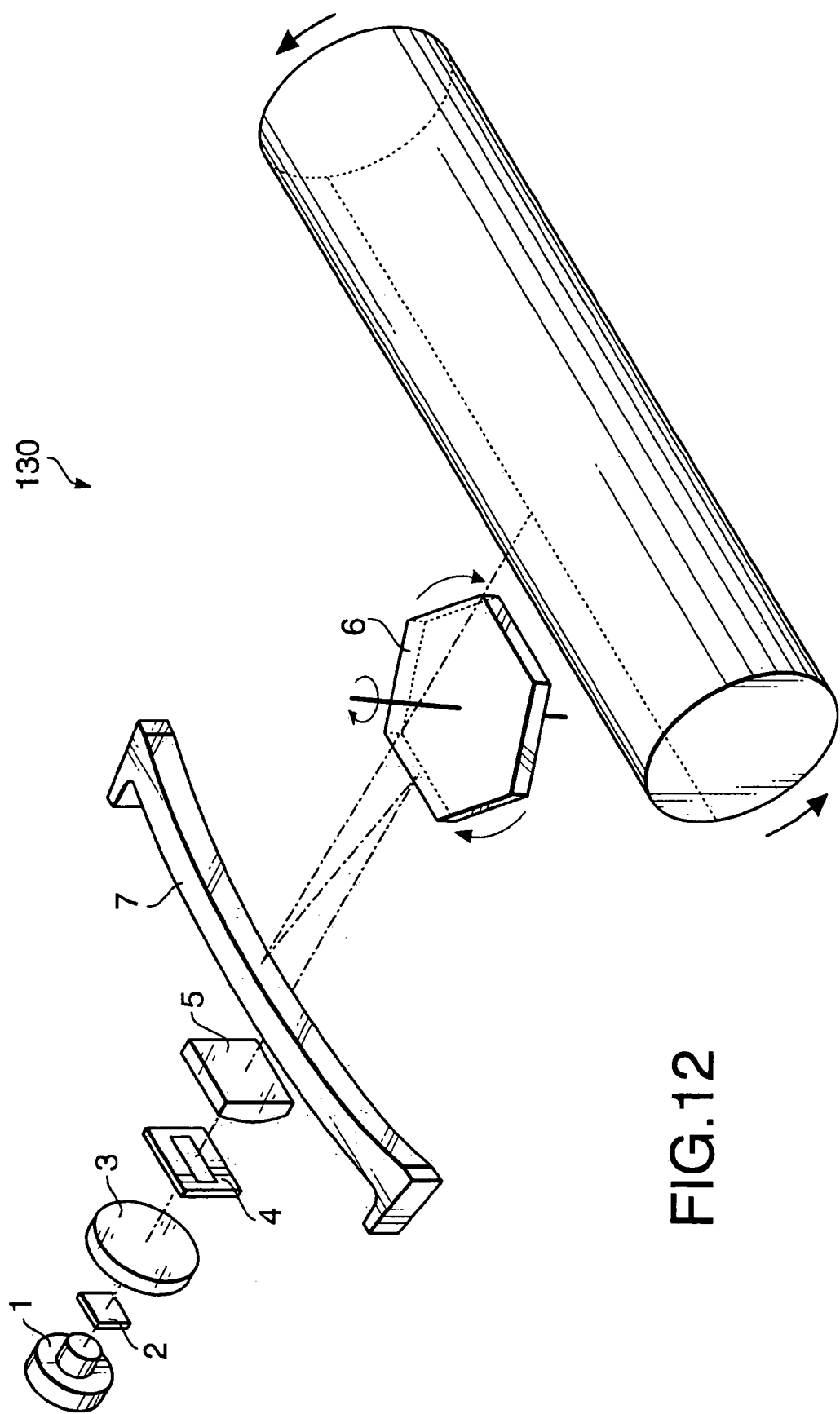
FIG. 12 shows a schematic optical diagram of a reflective scanning optical system including an fθ mirror as the imaging optical system.

Further, while the present invention is applied to a transmissive scanning optical system including the fθ lens group 7 as the imaging optical system, the present invention can also be applied to a reflective scanning optical system 130 including an fθ mirror 7' as the imaging optical system as shown in FIG. 12. In the reflective scanning optical system 130, the increase of the intensity of the side lobe caused by microscopic undulations of an optical surface of the imaging optical system is larger than that caused by the transmissive scanning optical systems, by which the black stripes in halftone printing occur more frequently in the reflective scanning optical systems. By applying the present invention to the reflective scanning optical system 130, the intensity of the side lobe can be reduced sufficiently and an occurrence of the black stripes in halftone printing can be reduced.

SECOND EMBODIMENT

A second embodiment of the present invention has basically the same configuration as the first embodiment except that a collimator lens 8 having four areas which protrude toward a beam emerging side of the collimator lens 8 and which produce phase differences is used in place of the collimator lens 3. Therefore, only the difference from the first embodiment will be explained below for the sake of simplicity.

A concrete numerical configuration of the collimator lens 8 on an optical axis thereof is the same as the numerical configuration of the collimator lens 3 indicated in TABLE 1.

A front surface (a light source side) of the collimator lens 8 is a rotationally symmetrical aspherical surface. A numeral configuration of the front surface of the collimator lens 8 is the same as that of the collimator lens 3 indicated in TABLE 2.

Figure 13:
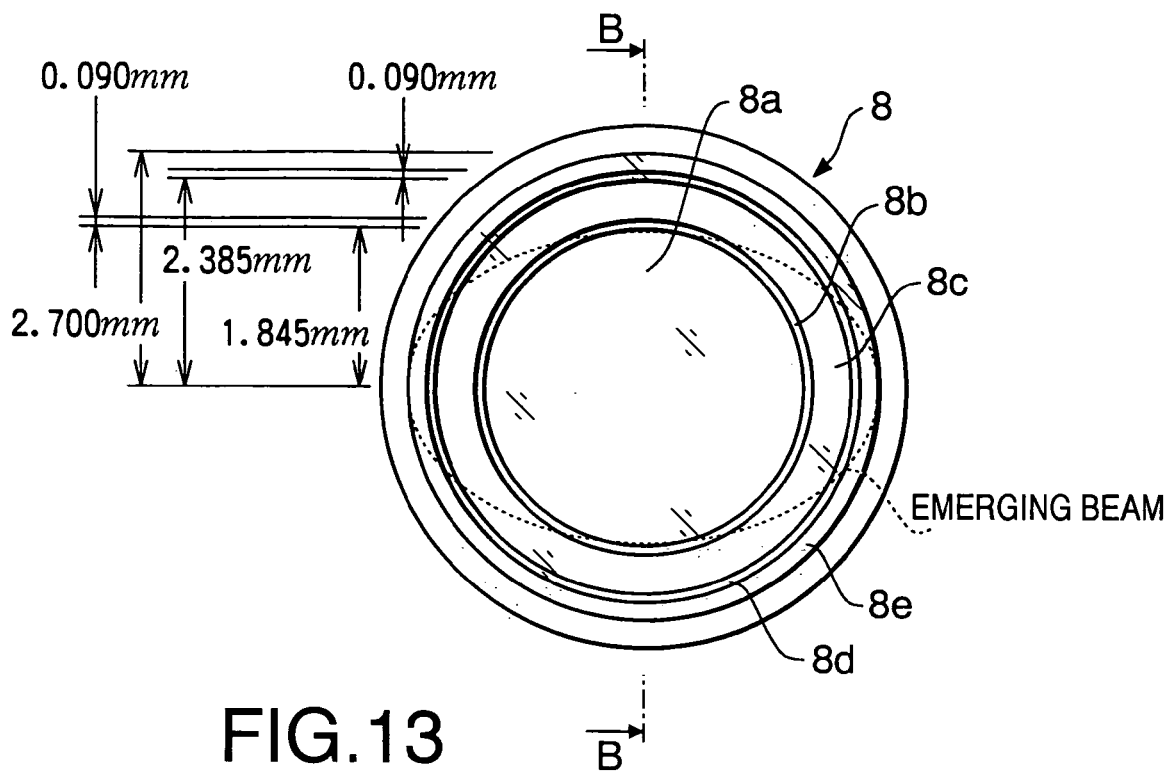
FIG. 13 shows a rear surface of a collimator lens according to a second embodiment viewed from a beam emerging side.
Figure 14:
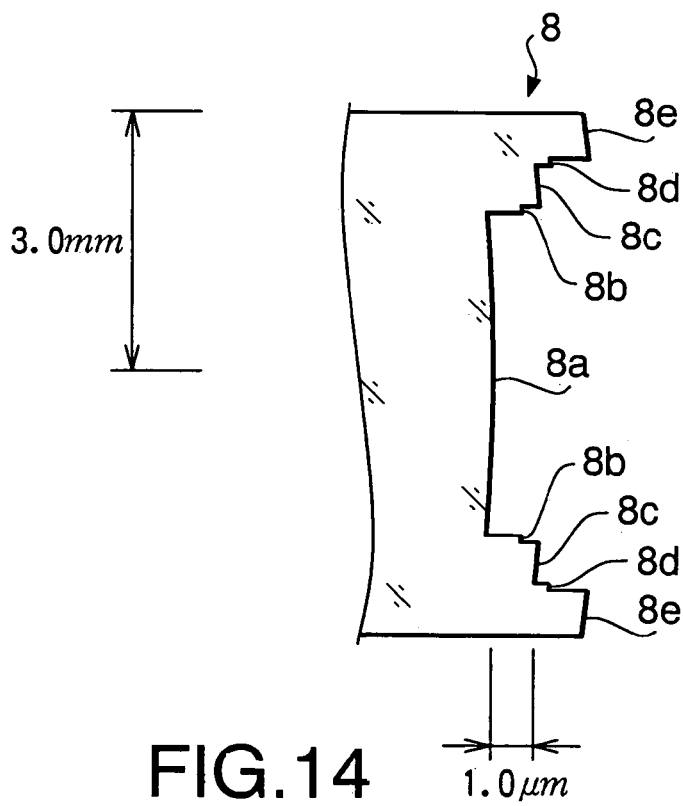
FIG. 14 shows a partial cross section of the collimator lens in FIG. 13.

The rear surface of the collimator lens 8 will be described in detail. FIG. 13 shows the rear surface of the collimator lens 8 viewed from a beam emerging side. FIG. 14 shows a partial cross section of the collimator lens 8 cut along a line B—B shown in FIG. 13. It should be noted that, in FIG. 13, a size in a direction of the optical axis of the collimator lens 8 (i.e., a horizontal direction on FIG. 14) is exaggerated.

As shown in FIG. 13, the rear surface of the collimator lens 8 includes a central area 8a having a circular form and situated at a central section of the rear surface, a first area 8b which has a form of a ring and in which the central area 8a is inscribed, and a second area 8c which has a form of a ring and in which the first area 8b is inscribed. The rear surface of the collimator lens 8 further includes a third area 8d which has a form of a ring and in which the second area 8c is inscribed and a fourth area 8e which has a form of a ring and in which the third area 8d is inscribed.

As shown in FIG. 14, the first area 8b protrudes toward the beam emerging side with respect to the central area 8a. The second area 8c protrudes toward the beam emerging side with respect to the first area 8b. Further, the third area 8d protrudes toward the beam emerging side with respect to the second area 8c. The fourth area 8e protrudes toward the beam emerging side with respect to the third area 8d.

Since protruding sizes of the first through forth areas 8b–8e with respect to the central area 8a are extremely small, the macroscopic shape of the rear surface of the collimator 8 is a continuous surface.

The central surface 8a is formed to be a rotationally symmetrical aspherical surface. Similarly to the rear surface of the collimator lens 3 of the first embodiment, the first area 8b is formed to be a portion of an imaginary rotational symmetrical aspherical surface shifted a certain distance along the optical axis from the central area 8a. Also, each of the second through fourth area 8c–8e is formed to be a portion of an imaginary rotational symmetrical aspherical surface shifted a certain distance along the optical axis from the central area 8a.

When each of surface shapes of the central area 8a and the first through fourth areas 8b–8e is expressed using the equation (12), these surfaces have a conical coefficient and aspherical coefficients indicated in TABLE 4. Aspherical coefficients not shown in TABLE 4 are all zero. Symbols in TABLE 4 have the same meanings as those indicated in TABLE 3.

TABLE 4

|  | Central Area | First Area | Second Area | Third Area | Fourth Area |
|---|---|---|---|---|---|
| Hmax | 1.8450 mm | 1.9350 mm | 2.3850 mm | 2.4750 mm | 2.7000 mm |
| R | −5.8000 mm | −5.8003 mm | −5.8005 mm | −5.8006 mm | −5.8010 mm |
| κ | −0.5000 | −0.5000 | −0.5000 | −0.5000 | −0.5000 |
| $A_4$ | 1.0890E−04 | 1.0887E−04 | 1.0886E−04 | 1.0885E−04 | 1.0882E−04 |
| $A_6$ | 7.1370E−06 | 7.1336E−06 | 7.1320E−06 | 7.1307E−06 | 7.1269E−06 |
| $A_8$ | 2.2930E−07 | 2.2938E−07 | 2.2942E−07 | 2.2945E−07 | 2.2954E−07 |
| $A_{10}$ | 1.2660E−08 | 1.2643E−08 | 1.2635E−08 | 1.2629E−08 | 1.2610E−08 |
| ΔD | 0.00000 mm | 0.00089 mm | 0.00134 mm | 0.00167 mm | 0.00268 mm |

The collimator lens 8 is positioned so that part of the beam L1 (see FIG. 3) emerged from the cover glass 2 in the vicinity of a central axis of the beam L1 passes through the central area 8a.

As shown in FIG. 13 and TABLE 4, the maximum effective radius of the fourth area 8e is 2.7 mm, and the maximum effective radius of the central area 8a is 1.845 mm. A width of the first area 8b in the radial direction is 0.09 mm. The maximum effective radius of the second area 8c is 2.385 mm. A width of the third area 8d in the radial direction is 0.09 mm.

The beam passed through the collimator lens 8 is shaped to have an elliptical form having the major axis extending in the main scanning direction and the minor axis extending in the auxiliary scanning direction (see a broken line in FIG. 13). In the second embodiment, the major radius of the cross sectional form of the beam is 2.7 mm, and the minor radius is 1.8 mm. Therefore, most of the beam L1 passes through the central area 8a, and a small portion of the beam L1 passes through the first through fourth areas 8b–8e.

As described above, the first through fourth areas 8b–8e protrude toward the beam emerging side from the central area 8a, each of the first through fourth areas 8b–8e functions to produce a phase difference between the beam passing therethrough and the beam passing through the central area 8a.

More specifically, the beam which passed through the first area 8b has the phase difference of $-4\pi/3$ [rad] corresponding to an optical path difference of 2/3 wavelength ($2\lambda/3$ [nm]). The beam which passed through the second area 8c has the phase difference of $-2\pi$ [rad]. Further, the beam which passed through the third area 8d has the phase difference of $-5\pi/2$ [rad] corresponding to an optical path difference of 5/4 wavelength ($5\lambda/4$ [nm]). The beam which passed through the fourth area 8e has the phase difference of $-4\pi$ [rad].

In this case, the beams passed through the central area 8a, the second area 8c and the fourth area 8e are in phase with respect to each other. The beam passed through the first area 8b and the beam passed through the third area 8d are given the phase differences of $-4\pi/3$ [rad] and $-5\pi/2$ [rad], respectively, with respect to the beam passed through the central area 8a.

If the phase difference $-4\pi/3$ of the beam which passed through the first area 8b is defined as the phase difference $\theta$ [rad] and the phase difference $-2\pi$ of the beam which passed through the second area 8c is defined as the phase difference $\theta'$ [rad], $\cos \theta = 0.5$ and $\cos \theta' = 1.0$, and therefore the phase differences $\theta$ and $\theta'$ given by the first and second areas 8b and 8c satisfy the conditions (6)–(10).

$\cos \theta \leq 0$ (6)

$-10\pi < \theta < 0$ (7)

$0.9 \leq \cos \theta'$ (8)

$-10\pi < \theta' < 0$ (9)

$\theta' < \theta$ (10)

If the phase difference $-5\pi/2$ of the beam which passed through the third area 8d is defined as the phase difference $\theta$ [rad] and the phase difference $-4\pi$ of the beam which passed through the fourth area 8e is defined as the phase difference $\theta'$[rad], $\cos \theta = 0$ and $\cos \theta' = 1.0$, and therefore the phase differences $\theta$ and $\theta'$ given by the third and fourth areas 8d and 8e also satisfy the conditions (6)–(10).

Intensity distribution of the beam scanned on the scan target surface S by the scanning optical system according to the second embodiment will be explained. In the following, the intensity distribution in the scanning optical system according to the second embodiment (i.e., the scanning optical system with the first through fourth areas 8b–8e) is compared with the comparative example (FIG. 7) which has the same configuration as the second embodiment except that the rear surface of the collimator lens 8 does not have the first through fourth areas 8b–8e (i.e., the scanning optical system without the first through fourth areas 8b–8e).

Figure 15:
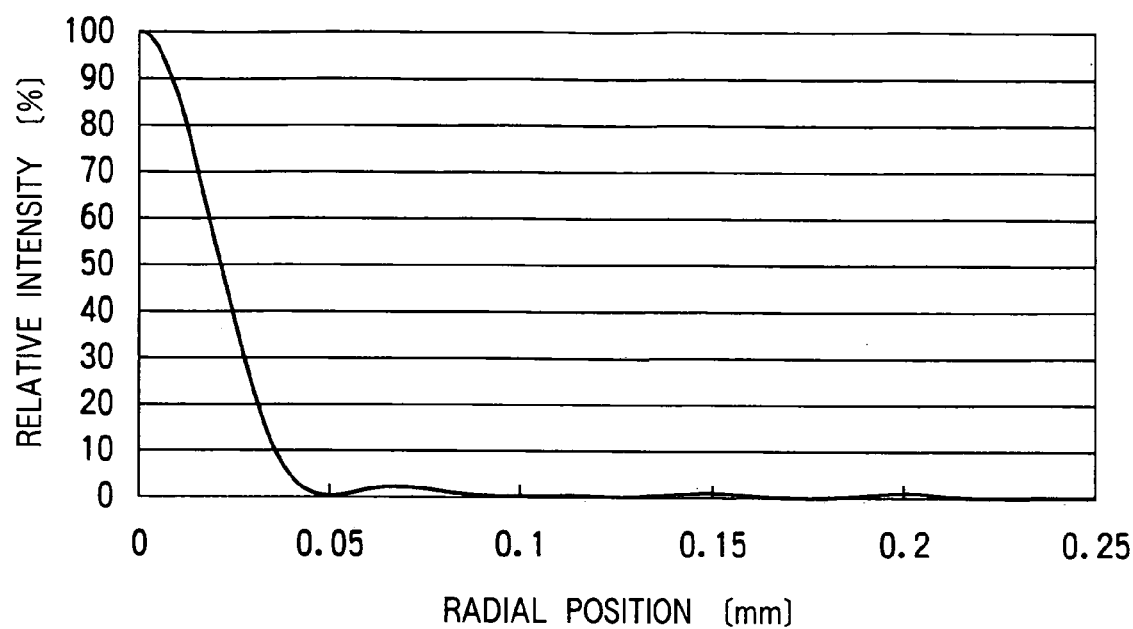
FIG. 15 is a graph showing intensity distribution of a beam formed on the scan target surface S by a scanning optical system according to the second embodiment.

FIG. 15 is a graph showing the intensity distribution of the beam formed on the scan target surface S by the scanning optical system according to the second embodiment. In FIG. 15, the intensity distribution is measured in a range from a central axis of the beam to a point 0.25 mm away from the central axis in the main scanning direction. In FIG. 15, the intensity is indicated as a ratio relative to the central intensity of the beam.

It should be noted that the intensity distribution of the beam formed on the scan target surface by the scanning optical system without the first through fourth areas is indicated in FIG. 7.

Figure 16:
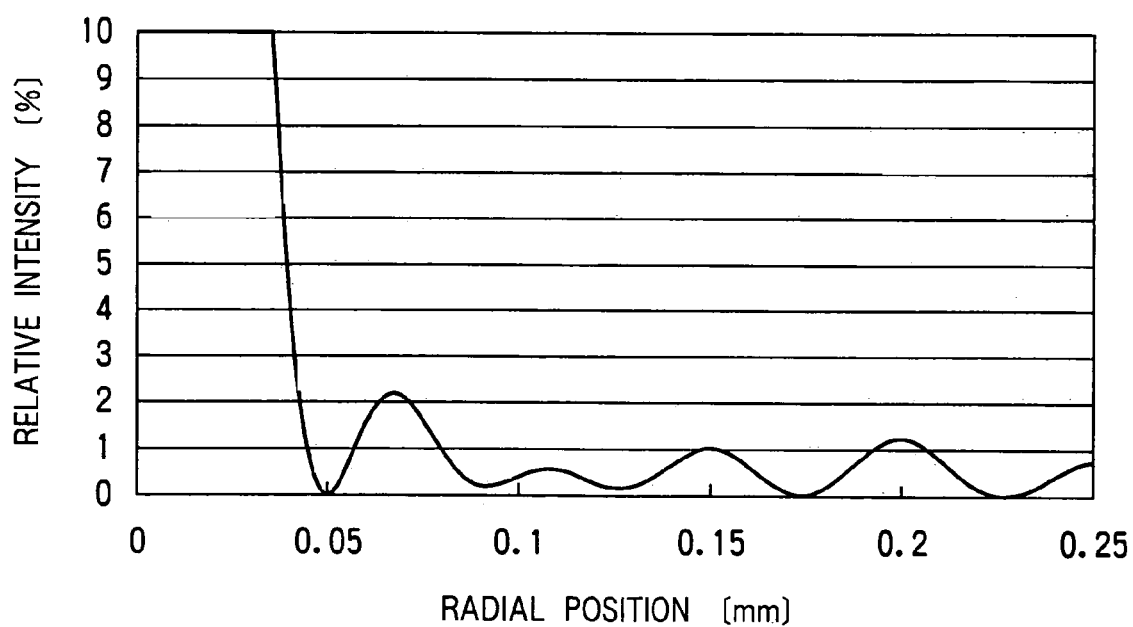
FIG. 16 is a graph magnifying a relative intensity range 0%–10% of the graph of FIG. 15.

FIG. 16 is a graph magnifying a relative intensity range 0%–10% of the graph of FIG. 15. The graph magnifying a relative intensity range 0%–10% of the graph of FIG. 7 is shown in FIG. 9.

As described above with reference to FIGS. 7 and 9, in the case where the first through fourth areas 8b–8e are not formed on the rear surface of the collimator lens 8, the intensity of the side lobe gets lower as the distance between the side lobe and the main beam gets longer, and the intensity of the side lobe adjacent to the main beam is a little over 4%.

In contrast, as shown in FIGS. 15 and 16, in the case where the first through fourth areas 8b–8e are formed on the rear surface of the collimator lens 8, although the intensity of the side lobe adjacent to the main beam exceeds a little over 2%, intensities of the other side lobes do not exceed 2%.

Therefore, even if one or more of intensities of the side lobes are increased by several % due to certain microscopic undulations of lens surfaces of the lenses 7a–7c of the fθ lens group 7, all of the intensities hardly exceed the threshold value required for the exposure of the photoconductive drum 12.

When the rear surface of the collimator lens 8 is viewed from the beam emerging side (see FIG. 13), it is desirable that a size S' which is a sum of a size of the first area 8b and a size of the third area 8d inside the broken line in FIG. 13 (i.e., inside the cross section of the beam) should be set properly relative to a size S of the cross section of the beam (see the broken line in FIG. 13). In the second embodiment, a ratio S'/S is 0.08, and therefore the collimator lens 8 satisfies the condition (11).

$0.03 < S'/S < 0.30$ (11)

As described above with regard to the collimator 3, the collimator lens 8 and the aperture stop 4 may also be formed integrally. Further, the collimator lens 8 may also be employed in the reflective scanning optical system including the fθ mirror 7' as the imaging optical system as shown in FIG. 12.

THIRD EMBODIMENT

A third embodiment of the present invention has basically the same configuration as the first embodiment except that a collimator lens 9 having four areas which are recessed toward a beam incident side of the collimator lens 9 and which produce phase differences is used in place of the collimator lens 3. Therefore, only the difference from the first embodiment will be explained below.

A concrete numerical configuration of the collimator lens 9 on an optical axis thereof is the same as the numerical configuration of the collimator lens 3 indicated in TABLE 1.

A front surface (a light source side) of the collimator lens 9 is a rotationally symmetrical aspherical surface. A numeral configuration of the front surface of the collimator lens 9 is the same as that of the collimator lens 3 indicated in TABLE 2.

The rear surface of the collimator lens 9 will be described in detail.

Figure 17:
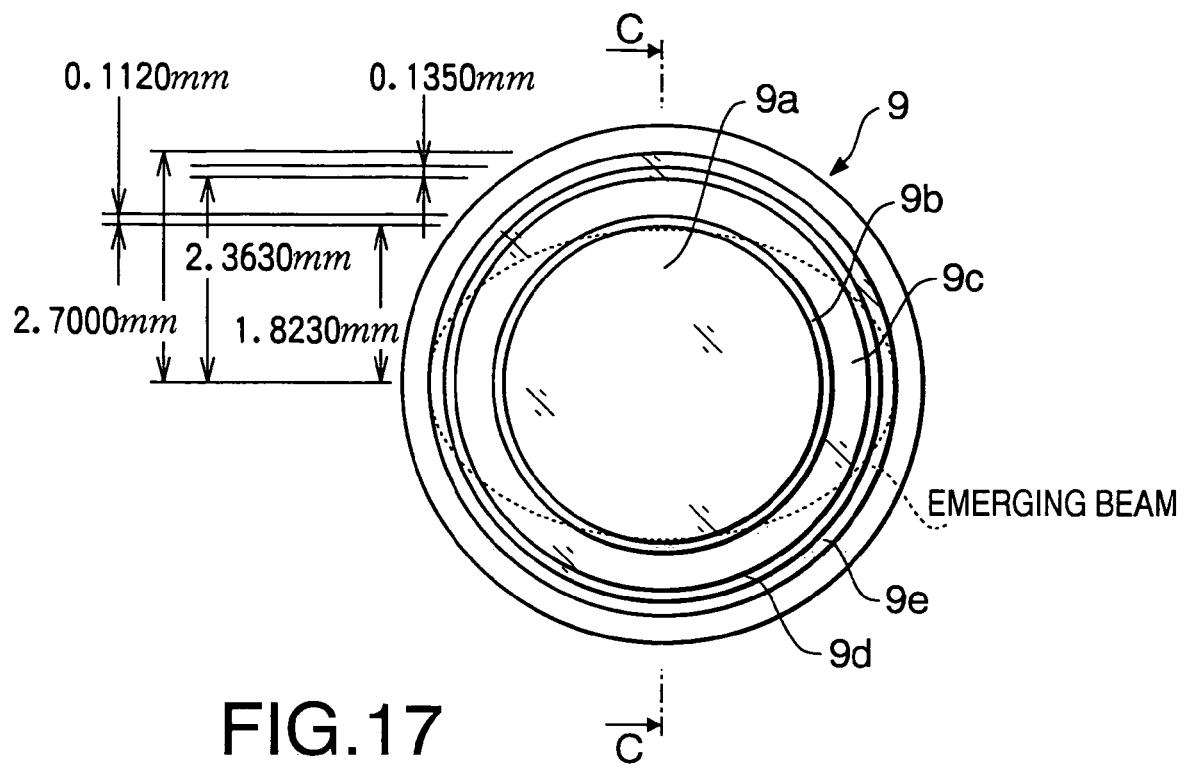
FIG. 17 shows a rear surface of a collimator lens according to a third embodiment viewed from a beam emerging side.
Figure 18:
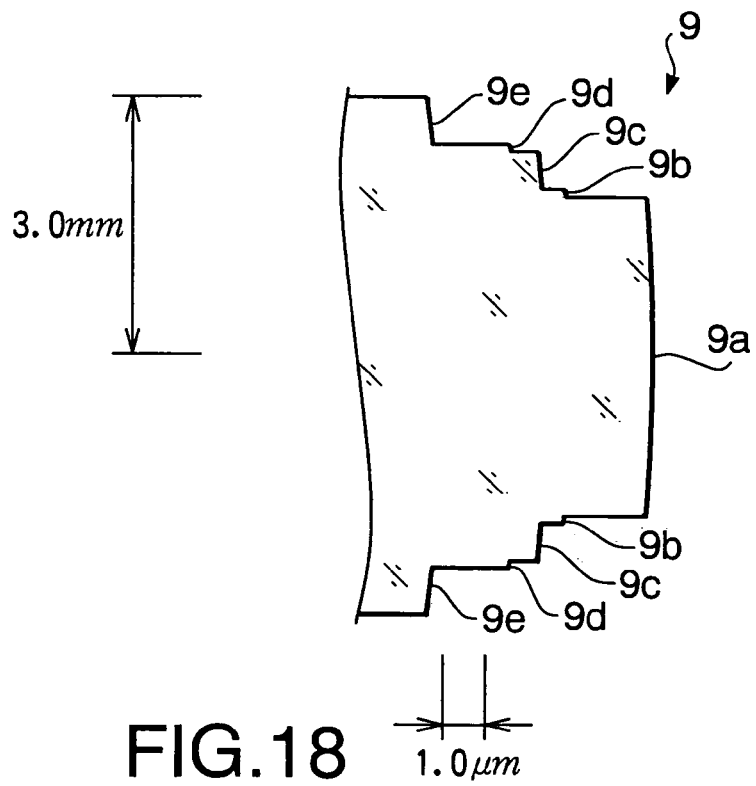
FIG. 18 shows a partial cross section of the collimator lens in FIG. 17.

FIG. 17 shows the rear surface of the collimator lens 9 viewed from the beam emerging side. FIG. 18 shows a partial cross section of the collimator lens 9 cut along a line C—C in FIG. 17. It should be noted that, in FIG. 17, a size in a direction of the optical axis of the collimator lens 9 (i.e., a horizontal direction on FIG. 18) is exaggerated.

As shown in FIG. 17, the rear surface of the collimator lens 9 includes a central area 9a having a circular form and situated at a central section of the rear surface, a first area 9b which has a form of a ring and in which the central area 9a is inscribed, and a second area 9c which has a form of a ring and in which the first area 9b is inscribed. The rear surface of the collimator lens 9 further includes a third area 9d which has a form of a ring and in which the second area 9c is inscribed and a fourth area 9e which has a form of a ring and in which the third area 9d is inscribed.

As shown in FIG. 18, the first area 9b is recessed toward the beam incident side with respect to the central area 9a. The second area 9c is recessed toward the beam incident side with respect to the first area 9b. Further, the third area 9d is recessed toward the beam incident side with respect to the second area 9c. The fourth area 9e is recessed toward the beam incident side with respect to the third area 9d.

Since recessing sizes of the first through forth areas 9b–9e with respect to the central area 9a are extremely small, the macroscopic shape of the rear surface of the collimator 9 is a continuous surface.

The central surface 9a is formed to be a rotationally symmetrical aspherical surface. Similarly to the rear surfaces of the collimator lens 8 of the second embodiment, the first area 9b is formed to be a portion of an imaginary rotational symmetrical aspherical surface shifted a certain distance along the optical axis from the central area 9a. Also, each of the second through fourth area 9c–9e is formed to be a portion of an imaginary rotational symmetrical aspherical surface shifted a certain distance along the optical axis from the central area 9a.

When each of surface shapes of the central area 9a and the first through fourth areas 9b–9e is expressed using the equation (12), these surfaces have a conical coefficient and aspherical coefficients indicated in TABLE 5. Aspherical coefficients not shown in TABLE 5 are all zero. Symbols in TABLE 5 have the same meanings as those indicated in TABLE 3.

The collimator lens 9 is positioned so that part of the beam L1 (see FIG. 3) emerged from the cover glass 2 in the vicinity of a central axis of the beam L1 passes through the central area 9a.

As shown in FIG. 17 and TABLE 5, the maximum effective radius of the fourth area 9e is 2.7 mm, and the maximum effective radius of the central area 9a is 1.823 mm. A width of the first area 9b in the radial direction is 0.112 mm. The maximum effective radius of the second area 9c is 2.363 mm. A width of the third area 9d in the radial direction is 0.135 mm.

The beam passed through the collimator lens 9 is shaped to have an elliptical form having the major axis extending in the main scanning direction and the minor axis extending in the auxiliary scanning direction (see a broken line in FIG. 17). In the third embodiment, the major radius of the cross sectional form of the beam is 2.7 mm, and the minor radius is 1.8 mm. Therefore, most of the beam L1 passes through the central area 9a, and a small portion of the beam L1 passes through the first through fourth areas 9b–9e.

As described above, the first through fourth areas 9b–9e are recessed toward the beam incident side from the central area 9a, each of the first through fourth areas 9b–9e functions to produce a phase difference between the beam passing therethrough and the beam passing through the central area 9a.

More specifically, the beam which passed through the first area 9b has the phase difference of $19\pi/6$ [rad] corresponding to an optical path difference of 19/12 wavelength ($19\lambda/12$ [nm]). The beam which passed through the second area 9c has the phase difference of $4\pi$ [rad]. Further, the beam which passed through the third area 9d has the phase difference of $5\pi$ [rad] corresponding to an optical path difference of 5/2 wavelength ($5\lambda/2$ [nm]). The beam which passed through the fourth area 9e has the phase difference of $8\pi$ [rad].

In this case, the beams passed through the central area 9a, the second area 9c and the fourth area 9e are in phase with respect to each other. The beam passed through the first area 9b and the beam passed through the third area 9c are given the phase differences of $19\pi/6$ [rad] and $5\pi$ [rad], respectively, with respect to the beam passed through the central area 9a.

If the phase difference $19\pi/6$ of the beam which passed through the first area 9b is defined as the phase difference $\theta$ [rad] and the phase difference $4\pi$ of the beam which passed through the second area 9c is defined as the phase difference $\theta$ [rad], $\cos\theta = -0.87$ and $\cos\theta' = 1.0$, and therefore the phase differences $\theta$ and $\theta'$ given by the first and second areas 9b and 9c satisfy the conditions (1)–(5).

$$\cos\theta \leq 0 \tag{1}$$

TABLE 5

|  | Central Area | First Area | Second Area | Third Area | Fourth Area |
| --- | --- | --- | --- | --- | --- |
| Hmax | 1.8230 mm | 1.9350 mm | 2.3630 mm | 2.4980 mm | 2.7000 mm |
| R | −5.8000 mm | −5.7992 mm | −5.7990 mm | −5.7988 mm | −5.7980 mm |
| κ | −0.5000 | −0.5000 | −0.5000 | −0.5000 | −0.5000 |
| $A_4$ | 1.0890E−04 | 1.0898E−04 | 1.0900E−04 | 1.0903E−04 | 1.0910E−04 |
| $A_6$ | 7.1370E−06 | 7.1362E−06 | 7.1360E−06 | 7.1358E−06 | 7.1350E−06 |
| $A_8$ | 2.2930E−07 | 2.3072E−07 | 2.3109E−07 | 2.3154E−07 | 2.3288E−07 |
| $A_{10}$ | 1.2660E−08 | 1.2607E−08 | 1.2593E−08 | 1.2576E−08 | 1.2526E−08 |
| ΔD | 0.00000 mm | 0.00212 mm | 0.00268 mm | 0.00335 mm | 0.00536 mm |

$$0 < \theta < 10\pi \quad (2)$$

$$0.9 \leq \cos \theta' \quad (3)$$

$$0 < \theta' < 10\pi \quad (4)$$

$$\theta < \theta' \quad (5)$$

If the phase difference 5π of the beam which passed through the third area 9d is defined as the phase difference θ [rad] and the phase difference 8π of the beam which passed through the fourth area 9e is defined as the phase difference θ' [rad], cos θ=−1.0 and cos θ'=1.0, and therefore the phase differences θ and θ' given by the third and fourth areas 9d and 9e also satisfy the conditions (1)–(5).

Intensity distribution of the beam scanned on the scan target surface S by the scanning optical system according to the third embodiment will be explained. In the following, the intensity distribution in the scanning optical system according to the third embodiment (i.e., the scanning optical system with the first through fourth areas 9b–9e) is compared with the comparative example (FIG. 7) which has the same configuration as the third embodiment except that the rear surface of the collimator lens 9 does not have the first through fourth areas 9b–9e (i.e., the scanning optical system without the first through fourth areas 9b–9e).

Figure 19:
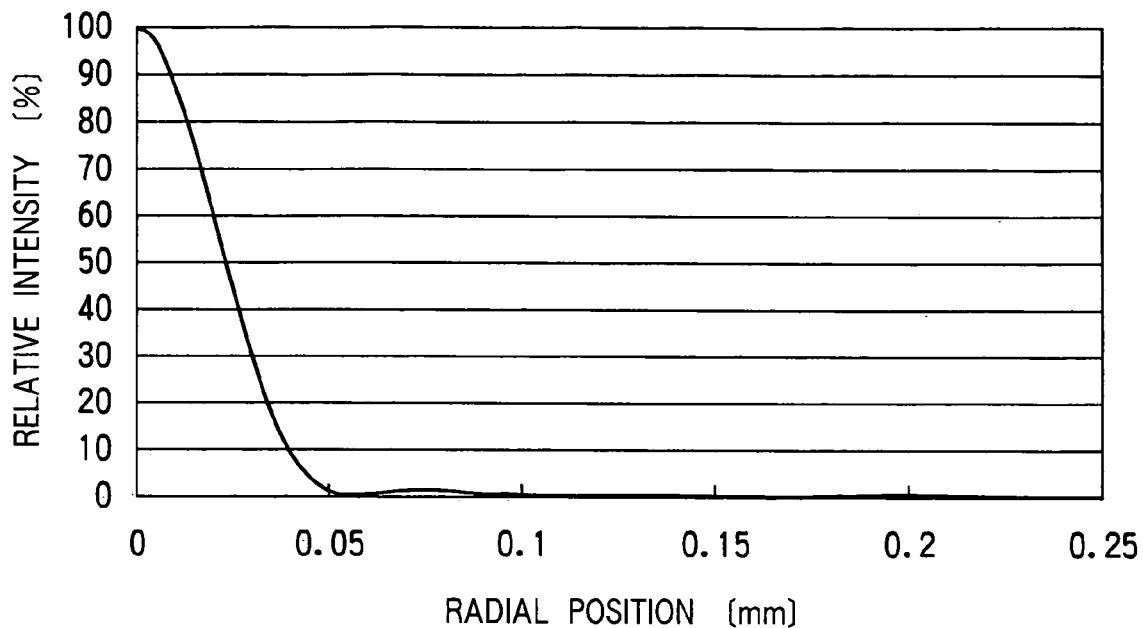
FIG. 19 is a graph showing intensity distribution of a beam formed on the scan target surface by a scanning optical system according to the third embodiment.

FIG. 19 is a graph showing the intensity distribution of the beam formed on the scan target surface S by the scanning optical system according to the third embodiment. In FIG. 19, the intensity distribution is measured in a range from a central axis of the beam to a point 0.25 mm away from the central axis in the main scanning direction. In FIG. 19, the intensity is indicated as a ratio relative to the central intensity of the beam.

It should be noted that the intensity distribution of the beam formed on the scan target surface by the scanning optical system without the first through fourth areas is indicated in FIG. 7.

Figure 20:
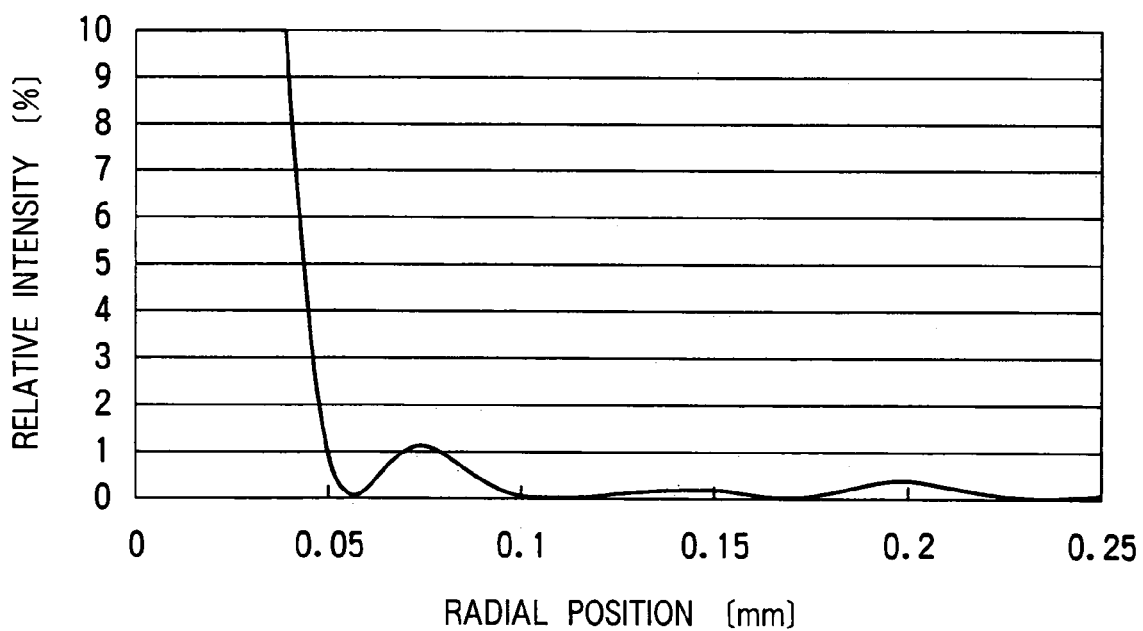
FIG. 20 is a graph magnifying a relative intensity range 0%–10% of the graph of FIG. 19.

FIG. 20 is a graph magnifying a relative intensity range 0%–10% of the graph of FIG. 19. The graph magnifying a relative intensity range 0%–10% of the graph of FIG. 7 is shown in FIG. 9.

As described above with reference to FIGS. 7 and 9, in the case where the first through fourth areas 9b–9e are not formed on the rear surface of the collimator lens 9, the intensity of the side lobe gets lower as the distance between the side lobe and the main beam gets longer, and the intensity of the side lobe adjacent to the main beam is a little over 4%.

In contrast, as shown in FIGS. 19 and 20, in the case where the first through fourth areas 9b–9e are formed on the rear surface of the collimator lens 9, although the intensity of the side lobe adjacent to the main beam exceeds a little over 1%, intensities of the other side lobes do not exceed 1%.

Therefore, even if one or more intensities of the side lobes are increased by several % due to certain microscopic undulations of lens surfaces of the lenses 7a–7c of the fθ lens group 7, all of the intensities of the side lobes hardly exceed the threshold value required for the exposure of the photoconductive drum 12.

When the rear surface of the collimator lens 9 is viewed from the beam emerging side (see FIG. 17), it is desirable that a size S' which is a sum of a size of the first area 9b and a size of the third area 9d inside the broken line in FIG. 17 (i.e., inside the cross section of the beam) is set properly relative to a size S of the cross section of the beam (see broken line in FIG. 17). In the third embodiment, a ratio S'/S is 0.10, and therefore the collimator lens 9 satisfies the condition (11).

$$0.03 < S'/S < 0.30 \quad (11)$$

As described above with regard to the collimator 3, the collimator lens 9 and the aperture stop 4 may also be formed integrally. Further, the collimator lens 9 may also be employed in the reflective scanning optical system including the fθ mirror 7' as the imaging optical system as shown in FIG. 12.

As described above, according to the invention, it is possible to sufficiently reduce the possibility that the intensity of the side lobe exceeds the threshold value to expose a photosensitive material on the scan target surface even if one or more lens surfaces of the imaging optical system have certain microscopic undulations.

Although the present invention has been described in considerable detail with reference to certain preferred embodiments thereof, other embodiments are possible.

The present disclosure relates to the subject matter contained in Japanese Patent Application No. P2002-346401, filed on Nov. 28, 2002, which is expressly incorporated herein by reference in its entirety.

What is claimed is:

1. A scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on the scan target surface, comprising:

a collimator lens being placed on an optical path between said light source and said deflecting system,
wherein at least one of a front surface and a rear surface of said collimator lens including:
a central area through which part of the laser beam in the vicinity of a central axis of the laser beam passes;
at least one first outer area through which part of the laser beam outside the laser beam incident on said central area passes, said at least one first outer area having an effect on the laser beam so that the laser beam after passing through said at least one first outer area is given a first phase difference with respect to the laser beam passing through said central area, the first phase difference not including a phase difference of zero; and
at least one second outer area through which part of the laser beam other than the laser beam incident on said central area and said at least one first outer area passes, said at least one second outer area having an effect on the laser beam so that the laser beam after passing through said at least one second outer area is given a second phase difference with respect to the laser beam passing through said central area, the second phase difference being different from the first phase difference and including a phase difference of zero.

2. The scanning optical system according to claim 1, wherein the first phase difference satisfies the following conditions:

$$\cos \theta \leq 0 \quad (1)$$

$$0 < \theta < 10\pi \quad (2)$$

where θ [rad] represents said first phase difference, and θ is positive (0<θ) when the thickness of said collimator lens changes in a decreasing direction from said central area through said at least one first outer area by a step formed between said central area and said at least one first outer area.

3. The scanning optical system according to claim 2, wherein the second phase difference satisfies the following conditions:

$$0.9 \leq \cos \theta' \quad (3)$$

$$0 < \theta' < 10\pi \quad (4)$$

$$\theta < \theta' \quad (5)$$

where θ' [rad] represents said second phase difference, and θ' is positive (0<θ') when the thickness of said collimator lens changes in a decreasing direction from said central area through said at least one second outer area by a sum of a step formed between said central area and said at least one first outer area and a step formed between said at least one first outer area and said at least one second outer area.

4. The scanning optical system according to claim 1, wherein the first phase difference satisfies the following conditions:

$$\cos \theta \leq 0 \quad (6)$$

$$-10\pi < \theta < 0 \quad (7)$$

where θ [rad] represents said first phase difference, and θ is negative (0>θ) when the thickness of said collimator lens changes in an increasing direction from said central area through said at least one first outer area by a step formed between said central area and said at least one first outer area.

5. The scanning optical system according to claim 4, wherein the second phase difference satisfies the following conditions:

$$0.9 \leq \cos \theta' \quad (8)$$

$$-10\pi < \theta' < 0 \quad (9)$$

$$\theta' < \theta \quad (10)$$

where θ' [rad] represents said second phase difference, and θ' is negative (0>θ') when the thickness of said collimator lens changes in an increasing direction from said central area through said at least one second outer area by a sum of a step formed between said central area and said at least one first outer area and a step formed between said at least one first outer area and said at least one second outer area.

6. The scanning optical system according to claim 1, wherein said at least one first outer area includes a plurality of first outer areas, and said at least one second outer area includes a plurality of second outer areas.

7. The scanning optical system according to claim 6, wherein the plurality of first outer areas and the plurality of second outer areas are provided in said scanning optical system as a plurality of pairs of the first and second outer areas.

8. The scanning optical system according to claim 7, wherein said plurality of pairs of said first and second outer areas include two pairs of said first and second outer areas.

9. The scanning optical system according to claim 7, wherein one of said first outer areas nearest to the central axis of the laser beam adjoins said central area from the outside of said central area with respect to the central axis of the laser beam.

10. The scanning optical system according to claim 9, wherein one of said second outer areas nearest to the central axis of the laser beam adjoins the one of said first outer areas nearest to the central axis of the laser beam from the outside of the one of said first outer areas nearest to the central axis of the laser beam with respect to the central axis of the laser beam.

11. The scanning optical system according to claim 6, wherein the plurality of first outer areas and the plurality of second outer areas are arranged alternately outward from said central area.

12. The scanning optical system according to claim 11, wherein the plurality of the first and second outer areas are formed to be concentrically arranged step-like rings, respectively, with respect to the central axis of the laser beam.

13. The scanning optical system according to claim 12, wherein thickness of said collimator lens changes in an increasing direction at each step formed between adjacent step-like rings.

14. The scanning optical system according to claim 12, wherein thickness of said collimator lens changes in a decreasing direction at each step formed between adjacent step-like rings.

15. The scanning optical system according to claim 1, wherein said scanning optical system satisfies a condition:

$$0.03 < S'/S < 0.3 \quad (11)$$

where S' represents a size of a portion of said at least one first outer area, the laser beam being incident on said at least one first outer area within the portion of said at least one first outer area, and S represents a size of a laser beam cross section orthogonal to the central axis of the laser beam on a surface of said collimator lens having said central area and at least one first and second outer areas.

16. The scanning optical system according to claim 1, wherein said collimator lens further includes a shading part as an aperture stop, and
wherein said central area and said at least one first and second outer areas are placed in an aperture of said shading part.

17. The scanning optical system according to claim 1, wherein said at least one first outer area and said at least one second outer area are arranged on both sides of said central area along the main scanning direction in order in which said at least one first outer area is arranged inside said at least one second outer area with reference to said central area.

18. The scanning optical system according to claim 1, wherein said imaging optical system includes a reflecting surface.

19. A printer having a scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on the scan target surface,
said scanning optical system including:
a collimator lens being placed on an optical path between said light source and said deflecting system,
wherein at least one of a front surface and a rear surface of said collimator lens including:
a central area through which part of the laser beam in the vicinity of a central axis of the laser beam passes;
at least one first outer area through which part of the laser beam outside the laser beam incident on said central area passes, said at least one first outer area having an effect on the laser beam so that the laser beam after passing through said at least one first outer area is given a first phase difference with respect to the laser beam passing through said central area, the first phase difference not including a phase difference of zero; and at least one second outer area through which part of the laser beam other than the laser beam incident on said central area and said at least one first outer area passes, said at least one second outer area having an effect on the laser beam so that the laser beam after passing through said at least one second outer area is given a second phase difference with respect to the laser beam passing through said central area, the second phase difference being different from the first phase difference and including a phase difference of zero.

* * * * *